(12) United States Patent
Mukoyama

(10) Patent No.: US 9,972,441 B2
(45) Date of Patent: May 15, 2018

(54) LAYERED CERAMIC CAPACITOR

(71) Applicant: KYOCERA Corporation, Kyoto-shi, Kyoto (JP)

(72) Inventor: Shota Mukoyama, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 0 days. days.

(21) Appl. No.: 15/528,857

(22) PCT Filed: Nov. 26, 2015

(86) PCT No.: PCT/JP2015/083171
§ 371 (c)(1),
(2) Date: May 23, 2017

(87) PCT Pub. No.: WO2016/084876
PCT Pub. Date: Jun. 2, 2016

(65) Prior Publication Data
US 2017/0323727 A1    Nov. 9, 2017

(30) Foreign Application Priority Data

Nov. 28, 2014 (JP) .................. 2014-241710

(51) Int. Cl.
| | |
|---|---|
| H01G 4/30 | (2006.01) |
| H01G 4/12 | (2006.01) |
| H01G 4/012 | (2006.01) |
| H01G 4/248 | (2006.01) |
| H01G 4/008 | (2006.01) |

(52) U.S. Cl.
CPC .............. *H01G 4/30* (2013.01); *H01G 4/012* (2013.01); *H01G 4/1209* (2013.01); *H01G 4/248* (2013.01); *H01G 4/008* (2013.01)

(58) Field of Classification Search
CPC ....................................................... H01G 4/30
USPC ..................................................... 361/301.4
See application file for complete search history.

(56) References Cited

U.S. PATENT DOCUMENTS

2014/0185184 A1* 7/2014 Ahn .................. H01G 4/30
361/301.4
2016/0293332 A1* 10/2016 Kato .................. H01G 4/30

FOREIGN PATENT DOCUMENTS

| JP | 2003-309036 A | 10/2003 |
|---|---|---|
| JP | 2011-129841 A | 6/2011 |

OTHER PUBLICATIONS

International Search Report (Form PCT/ISA/210) issued for PCT/JP2015/083171, dated Feb. 16, 2016.
Written Opinion (Form PCT/ISA/237) issued for PCT/JP2015/083171, dated Feb. 16, 2016.

* cited by examiner

*Primary Examiner* — Eric Thomas
(74) *Attorney, Agent, or Firm* — Volpe and Koenig, P.C.

(57) ABSTRACT

Resolution means: The multilayer ceramic capacitor includes an effective dielectric portion and cover layers. The effective dielectric portion includes dielectric ceramic layers and internal electrode layers that are alternately stacked. The cover layers are made of ceramic material and disposed on top and bottom surfaces of the effective dielectric portion. The cover layers include ceramic particles, which constitute the majority of the cover layers, and include glass particles. Some of the glass particles are present in gaps, which are formed between the ceramic particles.

7 Claims, 2 Drawing Sheets

LAYERED CERAMIC CAPACITOR

TECHNICAL FIELD

The present invention relates to a layered ceramic capacitor.

BACKGROUND ART

FIG. 2A is a perspective view schematically illustrating an ordinary layered ceramic capacitor, FIG. 2B is a cross-sectional view taken along line A-A in FIG. 2A, FIG. 2C is a cross-sectional view taken along line B-B in FIG. 2A, and FIG. 2D is an enlarged schematic cross-sectional view of a region in cover layers (A region) in FIG. 2A.

A layered ceramic capacitor 100 includes a capacitor portion 101, which exhibits capacitance, and external electrodes 103, which are disposed on both ends of the capacitor portion 101.

The capacitor portion 101 includes an effective dielectric portion 109 and cover layers 111. The effective dielectric portion 109 includes dielectric ceramic layers 105 and internal electrode layers 107 that are alternately stacked. The cover layers 111 are disposed on top and bottom surfaces of the effective dielectric portion 109. The cover layers 111 contain a main component the same as the main component of the dielectric ceramic layers 105.

In recent years, there has been a need for further size reduction and capacitance increase of layered ceramic capacitors as mobile information devices are becoming smaller and capable of higher performance.

For this purpose, research has been conducted on layered ceramic capacitors about reducing the thickness of the dielectric ceramic layers 105 and increasing the dielectric constant of the dielectric materials. In addition, an attempt has been made to reduce the thickness of the cover layers 111, which are a constituent of the capacitor portion 101, to increase the volume fraction of the effective dielectric portion 109 (see Patent Literature 1, for example).

CITATION LIST

Patent Literature

Patent Literature 1: Japanese Unexamined Patent Application Publication No. 2011-129841A

SUMMARY OF INVENTION

Technical Problem

When a voltage is applied to a layered ceramic capacitor, an electrostrictive effect occurs therein, which causes the capacitor portion 101 to elongate in the stacking direction. Typically, the cover layers 111, which are disposed around the effective dielectric portion 109, have low sinterability than the effective dielectric portion 109 because the cover layers 111 do not include the internal electrode layers 107. As a result, the cover layers 111 include a large number of gaps 115 between ceramic particles 113.

Because of such a ceramic structure of the cover layers 111, when the cover layers 111 have a small thickness, an ability thereof to inhibit the elongation of the effective dielectric portion 109 in the stacking direction due to an electrostrictive effect is reduced, and consequently the strain of the effective dielectric portion 109 increases.

When the strain of the effective dielectric portion 109 is increased, the electric field concentrates to the region where the strain is concentrated in the effective dielectric portion 109, and as a result, the layered ceramic capacitor has a low breakdown voltage (BDV).

Accordingly, an object of the present invention is to provide a layered ceramic capacitor having an increased breakdown voltage.

Solution to Problem

A layered ceramic capacitor according to an aspect of the present invention includes an effective dielectric portion and cover layers. The effective dielectric portion includes dielectric ceramic layers and internal electrode layers that are alternately stacked. The cover layers are disposed on top and bottom surfaces of the effective dielectric portion. The cover layers include ceramic particles constituting a majority of the cover layers and glass particles. Some of the glass particles are present in gaps formed between the ceramic particles.

Advantageous Effects of Invention

Layered ceramic capacitors according to the aspect of the present invention have an increased breakdown voltage.

DESCRIPTION OF EMBODIMENTS

Figure 1A:
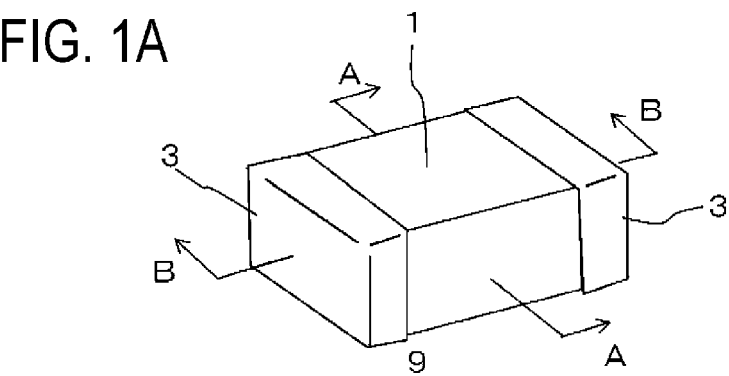
FIG. 1A is a perspective view schematically illustrating a layered ceramic capacitor according to an embodiment of the present invention.
Figure 1B:
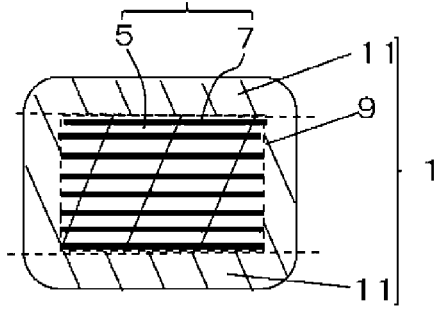
FIG. 1B is a cross-sectional view taken along line A-A in FIG. 1A.
Figure 1C:
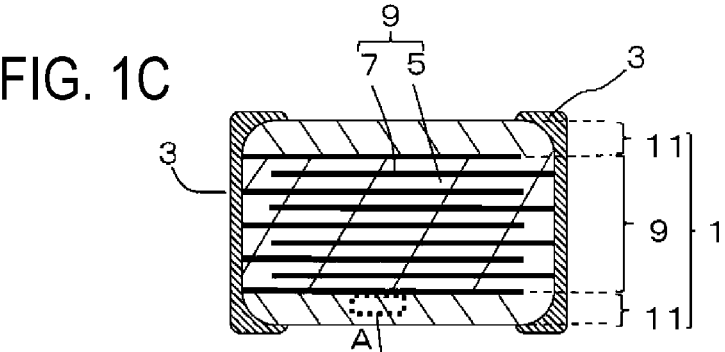
FIG. 1C is a cross-sectional view taken along line B-B in FIG. 1A.
Figure 1D:
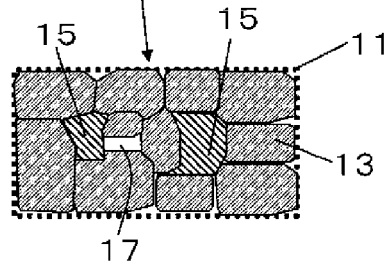
FIG. 1D is an enlarged schematic cross-sectional view of a region in cover layers (A region) in FIG. 1A.
Figure 2A:
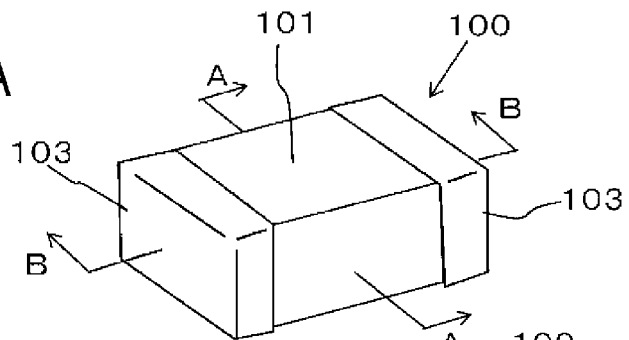
FIG. 2A is a perspective view schematically illustrating a conventional layered ceramic capacitor.
Figure 2B:
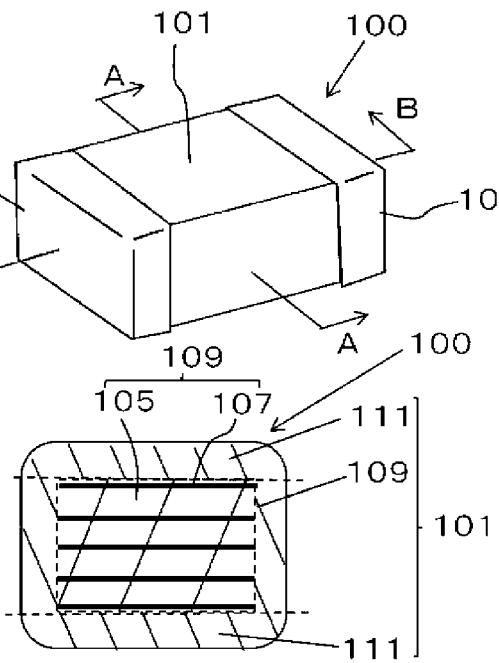
FIG. 2B is a cross-sectional view taken along line A-A in FIG. 2A.
Figure 2C:
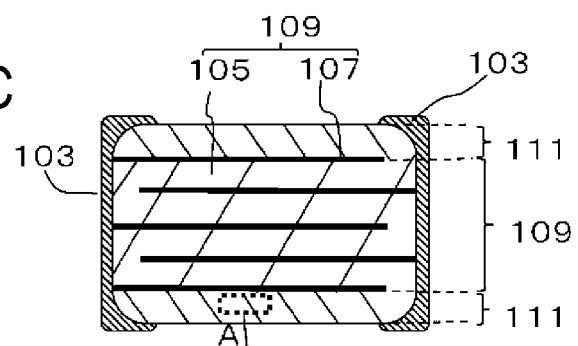
FIG. 2C is a cross-sectional view taken along line B-B in FIG. 2A.
Figure 2D:
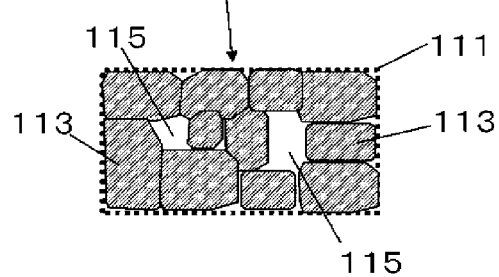
FIG. 2D is an enlarged schematic cross-sectional view of a region in cover layers (A region) in FIG. 1A.

FIG. 1A is a perspective view schematically illustrating a layered ceramic capacitor according to an embodiment of the present invention, FIG. 1B is a cross-sectional view taken along line A-A in FIG. 1A, and FIG. 1C is a cross-sectional view taken along line B-B in FIG. 1A. FIG. 1D is an enlarged schematic cross-sectional view of a region in cover layers (A region) in FIG. 1A.

The layered ceramic capacitor according to the embodiment includes a capacitor portion 1, which is a portion that contributes to capacitance exhibition, and external electrodes 3, which are disposed on two opposite ends of the capacitor portion 1.

The capacitor portion 1 includes an effective dielectric portion 9 and cover layers 11. The effective dielectric portion 9 includes dielectric ceramic layers 5 and internal electrode layers 7 that are alternately stacked. The cover layers 11 are made of ceramic material and disposed on top and bottom surfaces of the effective dielectric portion 9.

The cover layers 11 include ceramic particles 13, which constitute the majority of the cover layers 11, and also include glass particles 15. In the cover layers 11 in cross section, some of the glass particles 15 are present within gaps 17, which are formed between the ceramic particles 13. In this case, the glass particles 15 are fitted into the gaps 17 when the cover layers 11 are viewed in cross section.

In the layered ceramic capacitor according to the embodiment, the glass component included in the cover layers 11 is present, in the form of the glass particles 15, in the gaps 17 formed between the ceramic particles 13. As a result, the mechanical strength is increased compared with cover layers of conventional configurations, which include a large number of gaps 17 gaps 17 having a large total volume in the cover layers.

As a result, elongation of the effective dielectric portion 9 in the stacking direction is minimized even when a voltage is applied to the layered ceramic capacitor and an electrostrictive effect occurs in the effective dielectric portion 9.

Thus, the strain that occurs in the effective dielectric portion 9 is reduced and electric field concentration is less likely to occur in the effective dielectric portion 9. As a result, layered ceramic capacitors having a high breakdown voltage (BDV) are provided.

Furthermore, because of the denseness of the cover layers 11, the layered ceramic capacitor has an increased life in a moisture resistance load test.

Herein, the gaps 17 are not gaps at interfacial particle boundaries formed between two ceramic particles 13 nor gaps at triple junctions of particle boundaries formed between three ceramic particles 13. The gaps 17 are gaps formed by being surrounded by more than three ceramic particles 13 with the contours of the gaps 17 being of a polygonal shape having at least four sides or of a circular shape.

The glass particles 15 are present within the contours of the gaps 17, which have the shapes described above. The inner walls of the gaps 17 formed in the cover layers 11 and at least portions of the surfaces of the glass particles 15 are sintered together. In other words, the glass particles 15 that are a constituent of the cover layers 11 are in particulate form and are present so as to fill the gaps 17. Herein, the glass particles 15 are not limited to particles of glassy (amorphous) material but may be particles of any silicon oxide-based material including crystalline material.

The top and bottom surfaces of the effective dielectric portion 9 on which the cover layers 11 are disposed refer to the top side and the bottom side in the stacking direction of the effective dielectric portion 9. "The ceramic particles 13 constituting a majority" means that the volume fraction of the ceramic particles 13 in the effective dielectric portion 9 is not less than 80%. The volume fraction of the ceramic particles 13 is determined based on the area fraction of the ceramic particles 13 obtained by using a photograph of a cross section of the effective dielectric portion 9. In this case, the measured area fraction of the ceramic particles 13 is correspondingly also not less than 80%.

In the layered ceramic capacitor according to the embodiment, the average particle diameter of the glass particles 15 preferably ranges from 200 to 500 nm to increase the breakdown voltage.

In the layered ceramic capacitor, in the cover layers 11, when viewed in vertical section, $D_2/D_1$ preferably ranges from 0.5 to 2 where $D_1$ is the average particle diameter of the ceramic particles 13 and $D_2$ is the average particle diameter of the glass particles 15. In the cover layers 11, the size of the glass particles 15 is comparable to the size of the ceramic particles 13 and therefore is approximately comparable to the size of the gaps 17 formed in the cover layers 11. As a result, the gap fraction is reduced, and consequently, the moisture resistance as well as the breakdown voltage is further increased.

Furthermore, in the cover layers 11, when viewed in vertical section, the aspect ratio of the glass particles 15 is preferably greater than the aspect ratio of the ceramic particles 13. The elongate shape of the glass particles 15 minimizes crack propagation when cracking occurs in the cover layers 11. As a result, the mechanical strength of the cover layers 11 are improved, and therefore the breakdown voltage is further increased. In this case, "aspect ratio being great" means that the difference between the aspect ratio of the glass particles 15 and the aspect ratio of the ceramic particles 13 is not less than 0.2. When the difference is not greater than 0.1, the two aspect ratios are regarded as comparable.

The average particle diameter of the glass particles 15 in the cover layers 11 is determined by analyzing photographs obtained through observation of a cross section of the layered ceramic capacitor. Specifically, in a location in the photograph used for observing the cover layer 11, for a gap 17 in which a glass particle 15 is exposed to the opening, the area defined by the contour of the gap 17 is determined. A diameter of a circle having the determined area is designated as the particle diameter. This measurement is made on a plurality of glass particles 15 that are present within predetermined regions in the taken photograph, and the average value is determined. Also, the average particle diameter of the ceramic particles 13 is determined from the same photograph by the same method.

In the layered ceramic capacitor, it is preferred that, in the cover layers 11, when viewed in vertical section, the area fraction of gaps 17 in which the glass particles 15 are present range from 17 to 39% per unit area in the cover layers 11. Furthermore, it is preferred that, in the cover layers 11, when viewed in vertical section, the area fraction of gaps 17 in which the glass particles 15 are not present be not greater than 4% per unit area. Herein, whether the glass particles 15 are present in the gaps 17 is determined by the presence or absence of the glass particles 15 in a cross section of the cover layers 11.

Furthermore, it is preferred that the difference between the gap fraction of the cover layers 11 (area fraction of the gaps 17) and the gap fraction of the dielectric ceramic layers 5 (area fraction of the gaps 17) be not greater than 2%. The dielectric ceramic layers 5 are a constituent of the effective dielectric portion 9. Furthermore, it is preferred that, in the cover layers 11, when viewed in vertical section, the area fraction of gaps 17 in which the glass particles 15 are present to the total area of gaps 17 in which the glass particles 15 are not present and the gaps 17 in which the glass particles 15 are present be not less than 80% per unit area. When the area fraction of the gaps 17 in which the glass particles 15 are present and the area fraction of the gaps 17 in which the glass particles are not present are in the above-described range, the layered ceramic capacitor has a further improved breakdown voltage and moisture resistance (moisture resistance load properties).

The material of the dielectric ceramic layers 5 and the cover layers 11, which are constitutes of the layered ceramic capacitor according to the embodiment, is preferably at least one metal oxide selected from barium titanate, barium zirconate titanate, lead zirconate titanate, and titanium dioxide, or complex oxide of these, for example. Preferably, the thermal expansion coefficients of these materials range from $9 \times 10^{-6}$ to $11 \times 10^{-6}/°C$.

The material of the internal electrode layers 7 is preferably one metal selected from nickel, copper, palladium, and silver, or an alloy of any of these metals. Preferably, the thermal expansion coefficients of these metals range from $10 \times 10^{-6}$ to $20 \times 10^{-6}/°$ C.

In the layered ceramic capacitor according to the embodiment, it is preferable that the closer the internal electrode 7 is to either cover layer 11, the smaller average thickness the internal electrode 7 has than the average thickness thereof at the middle region of the effective dielectric portion 9 in the stacking direction. When the average thicknesses of the internal electrode layers 7 are reduced toward the cover layers 11, elongation of the effective dielectric portion 9 in the stacking direction due to thermal expansion of the internal electrode layers 7 is reduced in the regions near the cover layers 11, and as a result, strain that occurs in the effective dielectric portion 9 is further reduced. Consequently, the layered ceramic capacitor has a further increased breakdown voltage (BDV).

The layered ceramic capacitor configured as described above may be suitable for a ceramic capacitor including a large number of thin layers. Specifically, the average thicknesses of the dielectric ceramic layers 5 may range from 0.5 to 3 µm, the average thicknesses of the internal electrode layers 7 may range from 0.2 to 2 µm, the number of the internal electrode layers 7 in the effective dielectric portion 9 may be not less than 100, and the thicknesses of the cover layers 11 may be not greater than 0.02 relative to the thickness of the effective dielectric portion 9 in the stacking direction, which is taken as 1.

Next, a method for producing the layered ceramic capacitor according to the embodiment will be described. Firstly, the material of the dielectric ceramic layers 5 and the cover layers 11 is prepared. The material is, for example, a barium titanate-based dielectric powder. An organic vehicle is used to the powder to prepare a ceramic slurry, and then ceramic green sheets are produced by a sheet forming process such as a doctor blade process or a die coating process. To the ceramic green sheets for the cover layers 11 is added a glass powder having an average particle diameter greater than the average particle diameter of a glass powder added to the green sheets for the dielectric ceramic layers 5.

The average particle diameter of the glass particles and the aspect ratio of the glass particles can be varied by using a glass powder having a different average particle diameter. In the cover layers 11, the area fraction of the gaps and the area fraction of the gaps in which glass particles are present can be varied by varying the content of the glass powder to be contained in the ceramic green sheets.

Next, a conductive paste for the internal electrode layers 7 is prepared. The conductive paste may be nickel-based or copper-based, for example. Then, patterned sheets are formed using the conductive paste. Each of the pattered sheets includes rectangular internal electrode patterns formed on a main surface of the ceramic green sheet.

Next, a plurality of the patterned sheets are stacked together to form a core laminate. Then, a predetermined number of the ceramic green sheets on which the conductive patterns are not formed are stacked on the top and bottom surfaces of the core laminate, and this is subjected to pressurizing and heating to form a parent laminate including a plurality of laminates, each of which is to serve as the capacitor portion 1.

Next, the parent laminate is cut into the laminates. Then, the produced laminates are subjected to firing under predetermined conditions to produce the capacitor portions 1.

Next, external electrodes 3 are formed on end portions of the capacitor portion 1, which results from the firing. The end portions include the end surfaces to which the internal electrode layers 7 are exposed. Then, as necessary, a nickel plating layer and a tin plating layer are formed thereon to complete the layered ceramic capacitor.

Examples

As described below, layered ceramic capacitors were specifically produced and evaluated. Firstly, the following dielectric powders for forming the dielectric ceramic layers and the cover layers were prepared. The material powders prepared for the dielectric powders were a barium titanate powder, a MgO powder, a $Y_2O_3$ powder, and a $MnCO_3$ powder. These powders were mixed at the following ratio. Based on the amount of the barium titanate powder, taken as 100 moles, 2 moles of the MgO powder, 0.5 moles of the $Y_2O_3$ powder, and 0.5 moles of the $MnCO_3$ powder were used. Furthermore, based on 100 parts by mass of the barium titanate powder, 1 part by mass of a glass powder ($SiO_2$=55, BaO=20, CaO=15, and $Li_2O$=10 (mol %)) was added. In this manner, the dielectric powder was prepared. For the ceramic green sheets for the dielectric ceramic layers, a glass powder having an average particle diameter of 100 nm was used, and for the ceramic green sheets for the cover layers, glass powders having average particle diameters shown in Table 1 were used. In this case, among the glass powders used for the ceramic green sheets for the cover layers, the glass particles of the powders having an average particle diameter of 200 nm or greater remained as glass particles having the same average particle diameter after firing. The glass particles of the powder having an average particle diameter of 100 nm deformed and slightly melted after firing, resulting in an average particle diameter of the glass particles of approximately 110 nm, whereas the glass particles of the powder having an average particle diameter of 50 nm melted and did not remain in particulate form in the gaps. The barium titanate powder for forming the ceramic green sheets had an average particle diameter of 100 nm, in both for the dielectric ceramic layers and the cover layers.

Next, the dielectric powders were wet mixed and the mixture was added to a mixed solvent of toluene, in which a polyvinyl butyral resin was dissolved, and alcohol. This was subjected to wet mixing using zirconia balls of 1 mm in diameter to prepare a ceramic slurry, and the slurry was formed into ceramic green sheets having an average thickness of 1 µm using a doctor blade process.

Next, rectangular internal electrode patterns were formed on the upper surface of the ceramic green sheets to form patterned sheets. The conductive paste for forming the internal electrode patterns was prepared by mixing the following materials using a three-roll mill: 45 mass % of Ni powder; 20 mass % of barium titanate powder, which was used as a common material; 5 mass % of ethyl cellulose; and 30 mass % of an organic vehicle containing 95 mass % of octyl alcohol.

In Sample No. 7, the patterned sheets used for five layers closest to the top surface of the laminate, which was to serve as the effective dielectric portion, and five layers closest to the bottom surface thereof had internal electrode patterns whose thicknesses were smaller than the thicknesses of the remaining internal electrode patterns. In this case, a printing screen having an open area fraction of 0.8 was used. The open area fraction is relative to the open area fraction, taken as 1, of the printing screen used for the remaining patterned sheets.

Next, 500 layers of the produced patterned sheets were stacked together, and then ceramic green sheets on which no internal electrode patterns were formed were stacked on the top and bottom surfaces of the laminate. The resultant stack of layers was subjected to pressurizing and heating to be formed into a parent stack of layers including a plurality of laminates each of which was to serve as the capacitor portion. Thereafter, the parent laminate was cut into pieces of a predetermined size to form laminates.

Next, the produced laminates were degreased in atmospheric air and then subjected to firing in hydrogen-nitrogen mixed gas atmosphere, with an oxygen partial pressure of $10^{-8}$ Pa, at 1280° C. for two hours. In this manner, the capacitor portions were produced. For Sample No. 8, the firing was performed at a temperature approximately 10° C. higher than the temperature for the other samples.

The size of the produced capacitor portions was similar to the size of Type 1005, and was approximately 0.95 mm×0.48 mm×0.48 mm. The average thickness of the dielectric ceramic layers was 0.7 µm, and the average thickness per layer of the internal electrode layers in the effective dielectric portion was 0.6 µm. The average thickness of the cover layers was 40 µm. In Sample No. 7, the average thickness per layer of the internal electrode layers located in the uppermost five layers and the lowermost five layers in the effective dielectric portion was 0.5 µm.

The average thicknesses of the dielectric ceramic layers and the average thicknesses per layer of the internal electrode layers were determined as follows. In an upper layer, a middle layer, and a lower layer in the stacking direction in a cross section of the effective dielectric portion, which was a constituent of the layered ceramic capacitor, measurements were made on the dielectric ceramic layers and the internal electrode layers. Specifically, measurements were made at both end portions (locations approximately 1 µm inward of the ends) and middle regions (nine locations in total) of each of the layers and the average values were determined.

Next, a copper paste was applied to the end portions of the produced capacitor portions and they were heated at approximately 800° C. to form the external electrodes.

Next, a Ni plating layer and a Sn plating layer, in this order, were formed on the surfaces of the external electrodes by an electroplating process to produce the layered ceramic capacitors.

Next, the following evaluations were made on the produced layered ceramic capacitors. The average particle diameters of the glass particles and the ceramic particles contained in the cover layers were determined by analyzing photographs obtained through observation of cross sections of the produced layered ceramic capacitors. In this case, as for the glass particles, one location in the photograph used for observing the cover layer was selected and, in a 2 µm×2 µm region therein, the area of a gap in which a glass particle was exposed to the opening was determined. A diameter of a circle having the determined area is designated as the particle diameter of the glass particles. This measurement was performed for several particles and the average value was determined. Also, as for the ceramic particles, the area of a ceramic particle contained in the same region was determined and, in a similar manner, a diameter of a circle having the determined area is designated as the particle diameter of the ceramic particles. This measurement was performed for several particles and the average value was determined. In all the samples produced, the average particle diameter of the ceramic particles was 0.22 µm (220 nm).

Furthermore, the aspect ratios of the glass particles and the ceramic particles, for which the average particle diameters had been determined, were determined from the ratio between the largest dimension and the width perpendicular thereto (minor dimension). Evaluations were made regarding which had a larger aspect ratio between the glass particles and the ceramic particles. In this case, when the difference in the aspect ratio was 0.1 or less, it was determined that the two had the same aspect ratio.

In addition, from the same photograph, the area fraction of the gaps in which the glass particles were not present ((A) in Table 1) and the area fraction of the gaps in which the glass particles were present ((B) in Table 1) were determined. The determined area fractions were values per unit area of the cover layers. Furthermore, from these values, the proportion of the area of the gaps in which the glass particles were present ((C) in Table 1) was determined. The (C) in Table 1 was derived from the relationship between the area of the gaps in which the glass particles were not present and the area of the gaps in which the glass particles were present (C=B/(A+B)).

The breakdown voltage was measured using an ohmmeter. The number of samples for the breakdown voltage was 10, and the average value was determined. The breakdown voltages shown in Table 1 were values with respect to the average thickness of the dielectric ceramic layers.

The moisture resistance load test was conducted at 65° C. and an RH of 65% with an applied voltage of 6.3 V. After the samples were left to stand for 100 hours, the insulation resistance was measured and determined. The number of samples was 100 as shown in Table 1, and those samples that had an insulation resistance of $10^{-6} \Omega$ or less were determined to be defective.

The capacitance was measured at a temperature of 25° C. with a frequency of 1.0 kHz and an AC voltage of 1.0V/µm using an LCR meter (manufactured by Hewlett-Packard Company). In the measurement, the short circuiting rate was also determined.

TABLE 1

| | Cover layers | | | | | |
|---|---|---|---|---|---|---|
| Sample No. | Average particle diameter of glass particles nm | (Average particle diameter ratio) glass particles ($D_2$)/ceramic particles ($D_1$) nm | (Difference in aspect ratio) — | Area fraction of gaps in which glass particles were not present (A) % | Area fraction of gaps in which glass particles were present (B) % | (C) {B/(A + B)} % |
| 1 | 50 | 0.23 | — | 5 | 0 | 0 |
| 2 | 100 | 0.45 | Approximately the same | 5 | 1 | 17 |
| 3 | 200 | 0.91 | Glass particles are greater | 3 | 17 | 85 |
| 4 | 300 | 1.36 | Glass particles are greater | 2 | 22 | 91 |
| 5 | 400 | 1.88 | Glass particles are greater | 0 | 28 | 100 |

TABLE 1-continued

| | Cover layers | | | | | |
|---|---|---|---|---|---|---|
| Sample No. | Average particle diameter of glass particles nm | (Average particle diameter ratio) glass particles ($D_2$)/ceramic particles ($D_1$) nm | (Difference in aspect ratio) — | Area fraction of gaps in which glass particles were not present (A) % | Area fraction of gaps in which glass particles were present (B) % | (C) {B/(A + B)} % |
| 6 | 500 | 2.27 | Glass particles are greater | 0 | 39 | 100 |
| 7 | 200 | 0.91 | Glass particles are greater | 3 | 17 | 85 |
| 8 | 50 | 0.23 | — | 3 | 0 | 0 |
| 9 | 150 | 0.68 | Glass particles are greater | 4 | 10 | 40 |
| 10 | 350 | 1.59 | Glass particles are greater | 1 | 25 | 95 |

TABLE 2

| Sample No. | Breakdown voltage V/μm | Moisture resistance load test Quantity/100 | Capacitance# — | Short circuiting rate Quantity/100 |
|---|---|---|---|---|
| 1 | 60 | 10 | 1 | 5 |
| 2 | 80 | 6 | 1 | 3 |
| 3 | 100 | 0 | 1 | 0 |
| 4 | 120 | 0 | 1 | 0 |
| 5 | 125 | 0 | 1 | 0 |
| 6 | 130 | 0 | 1 | 0 |
| 7 | 110 | 0 | 1 | 0 |
| 8 | 45 | 23 | 0.95 | 10 |
| 9 | 92 | 4 | 1 | 2 |
| 10 | 122 | 0 | 1 | 0 |

Ratio to capacitance of Sample No. 1, taken as 1

As can been seen from the results of Tables 1 and 2, those samples in which some of the glass particles in the cover layers were present in the gaps formed between the ceramic particles (Samples Nos. 2 to 7, 9 and 10) had a breakdown voltage of not less than 80 V/μm. Also, in the moisture resistance load test, the number of defects was not greater than six.

Among the samples, those samples that had an average particle diameter of glass particles of 200 to 500 nm (Samples Nos. 3 to 7 and 10) had a breakdown voltage of not less than 100 V/μm and, in all of them, the number of defects in the moisture resistance load test was zero. Furthermore, in these samples (Samples Nos. 3 to 7 and 10), the proportion of the area of the gaps in which the glass particles were present ((C) in Table 1) was not less than 80% per unit area.

Furthermore, the sample in which the average thicknesses of the internal electrode layers are smaller in the regions contacting the cover layers than in the middle region in the stacking direction (Sample No. 7) had a breakdown voltage higher than the breakdown voltage of the sample in which a glass powder having the same average particle diameter (average particle diameter: 200 nm) was used (Sample No. 3).

In contrast, in the sample in which a glass powder having an average particle diameter of 50 nm was used (Sample No. 1), no glass particles exposed to the openings of the gaps were observed, and the breakdown voltage was 60 V/μm and the number of defects was 10 out of 100 in the moisture resistance load test. Furthermore, the sample produced using a glass powder having the same average particle diameter, namely 50 nm, (Sample No. 8) was produced at a firing temperature 10° C. higher. However, its breakdown voltage was 45 V/μm and the number of defects thereof was large, namely 23 out of 100 in the moisture resistance load test. In addition, Sample No. 8 had a reduced capacitance and an increased short circuiting rate compared with Sample No. 1.

As a result of analyzing (by EDS) the composition of a cross section of the capacitor portion, it was observed that, in the layered ceramic capacitor of Sample No. 8, a greater amount of glass components had diffused to the dielectric ceramic layers from the cover layers than in the layered ceramic capacitor of Sample No. 1.

REFERENCE SIGNS LIST

1 Capacitor portion
3 External electrode
5 Dielectric ceramic layer
7 Internal electrode layer
9 Effective dielectric portion
11 Cover layer
13 Ceramic particles
15 Glass particles
17 Gap

The invention claimed is:

1. A layered ceramic capacitor comprising:
   an effective dielectric portion comprising dielectric ceramic layers and internal electrode layers that are alternately stacked; and
   cover layers comprising a cover layer on a top surface and a cover layer on a bottom surface of the effective dielectric portion,
   the cover layers comprising:
      ceramic particles constituting a majority of the cover layers; and
      glass particles, some of the glass particles being present in gaps formed between the ceramic particles,
      wherein, in the cover layers, when viewed in vertical section, an area fraction of gaps in which the glass particles are present to a total area of gaps in which the glass particles are not present and the gaps in which the glass particles are present is 80% or greater per unit area.

2. The layered ceramic capacitor according to claim 1, wherein the glass particles have an average particle diameter of 200 to 500 nm.

3. The layered ceramic capacitor according to claim 1, wherein, in the cover layers, when viewed in vertical section, $D_2/D_1$ ranges from 0.5 to 2 where $D_1$ is an average particle diameter of the ceramic particles and $D_2$ is an average particle diameter of the glass particles.

4. The layered ceramic capacitor according to claim 1, wherein, in the cover layers, when viewed in vertical section, the glass particles have an aspect ratio greater than an aspect ratio of the ceramic particles.

5. The layered ceramic capacitor according to claim 1, wherein, in the cover layers, when viewed in vertical section, an area fraction of the gaps in which the glass particles are not present, relative to the total area of the cover layer, is 4% or less per unit area.

6. A layered ceramic capacitor comprising:
    an effective dielectric portion comprising dielectric ceramic layers and internal electrode layers that are alternately stacked; and
    cover layers comprising a cover layer on a top surface and a cover layer on a bottom surface of the effective dielectric portion,
    the cover layers comprising:
        ceramic particles constituting a majority of the cover layers; and
        glass particles, some of the glass particles being present in gaps formed between the ceramic particles
    wherein, in the cover layers, when viewed in vertical section, an area fraction of the gaps in which the glass particles are present, relative to the total area of the cover layer, ranges from 17 to 39% per unit area.

7. A layered ceramic capacitor comprising:
    an effective dielectric portion comprising dielectric ceramic layers and internal electrode layers that are alternately stacked; and
    cover layers comprising a cover layer on a top surface and a cover layer on a bottom surface of the effective dielectric portion,
    the cover layers comprising:
        ceramic particles constituting a majority of the cover layers; and
    glass particles, some of the glass particles being present in gaps formed between the ceramic particles,
    wherein, in the cover layers, when viewed in vertical section, the glass particles have an aspect ratio greater than an aspect ratio of the ceramic particles.

* * * * *